(12) United States Patent
Kim et al.

(10) Patent No.: US 11,631,899 B2
(45) Date of Patent: Apr. 18, 2023

(54) METHOD OF MANUFACTURING SOLID ELECTROLYTE

(71) Applicant: UNIST (ULSAN NATIONAL INSTITUTE OF SCIENCE AND TECHNOLOGY), Ulsan (KR)

(72) Inventors: Youngsik Kim, Ulsan (KR); Wooseok Go, Ulsan (KR); Jin Ho Pyo, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 106 days.

(21) Appl. No.: 16/361,021

(22) Filed: Mar. 21, 2019

(65) Prior Publication Data

US 2019/0305361 A1   Oct. 3, 2019

(30) Foreign Application Priority Data

Mar. 29, 2018   (KR) ........................ 10-2018-0036580

(51) Int. Cl.
| | |
|---|---|
| *H01M 10/058* | (2010.01) |
| *H01M 10/0562* | (2010.01) |
| *H01M 10/052* | (2010.01) |
| *H01M 10/054* | (2010.01) |

(52) U.S. Cl.
CPC ..... *H01M 10/058* (2013.01); *H01M 10/0562* (2013.01); *H01M 2300/0077* (2013.01)

(58) Field of Classification Search
CPC .......... H01M 10/058; H01M 10/0562; H01M 2300/0077; H01M 10/052; H01M 10/054; H01M 2300/0068; Y02E 60/10; C01B 25/45

USPC ........................................................ 429/103
See application file for complete search history.

(56) References Cited

U.S. PATENT DOCUMENTS

| | | | | |
|---|---|---|---|---|
| 2013/0337309 | A1* | 12/2013 | Virkar | H01M 10/3909 429/104 |
| 2015/0162642 | A1* | 6/2015 | Tsujimura | C03C 3/062 65/17.2 |
| 2015/0329413 | A1* | 11/2015 | Beall | C03B 32/02 501/32 |
| 2015/0364787 | A1* | 12/2015 | Zhang | H01B 1/08 429/321 |
| 2016/0141716 | A1* | 5/2016 | Ito | H01M 10/052 429/162 |
| 2017/0309964 | A1* | 10/2017 | Iwamoto | H01M 4/043 |

(Continued)

FOREIGN PATENT DOCUMENTS

KR   10-0294467 B1   4/2001

OTHER PUBLICATIONS

The difference between deionized water and distilled water, Besco Water Treatment, Web article, Jul. 2017 (Year: 2017).*

(Continued)

*Primary Examiner* — Christian Roldan
(74) *Attorney, Agent, or Firm* — Studebaker & Brackett PC

(57) ABSTRACT

Disclosed is a method of manufacturing a solid electrolyte using water as a solvent. The method includes dissolving a precursor in water to form a slurry, drying the slurry to form granules, pressing the granules to form a pressed solid body, and sintering the pressed solid body to manufacture a solid electrolyte.

3 Claims, 5 Drawing Sheets
(3 of 5 Drawing Sheet(s) Filed in Color)

(56) References Cited

U.S. PATENT DOCUMENTS

2019/0207237 A1\* 7/2019 Takeuchi ............ H01M 8/1016
2019/0207239 A1\* 7/2019 Takeuchi ............. H01M 8/083

OTHER PUBLICATIONS

Lemoisson et al., Understanding and Improving Powder Metallurgical Processes, Science Direct, 2005 (Year: 2005).\*
Morris et al., Cold Isostatic Pressing, Sceince Direct, 1991 (Year: 1991).\*
Https://www.uswatersystems.com/deionized-water-vs-distilled-water#:~:text=Deionized%20(DI)%20water%20is%20water, condensed%2C%20leaving%20most%20impurities%20behind. (Year: 2022).\*

\* cited by examiner

EDS point spectrum analysis

EDS point spectrum analysis

EDS point spectrum analysis

EDS point spectrum analysis

METHOD OF MANUFACTURING SOLID ELECTROLYTE

CROSS REFERENCE TO RELATED APPLICATION

The present application claims priority to Korean Patent Application No. 10-2018-0036580, filed Mar. 29, 2018. The entire contents of which is incorporated herein for all purposes by this reference.

FIELD OF THE INVENTION

The present invention relates to a method of manufacturing a solid electrolyte, and more particularly to a method of manufacturing a solid electrolyte using water as a solvent.

DESCRIPTION OF THE RELATED ART

A secondary battery is configured such that metal ions (for example, lithium ions or sodium ions) move from a positive electrode to a negative electrode during charging of the secondary battery and such that the metal ions move from the negative electrode to the positive electrode during discharging of the secondary battery. In this case, a solid electrolyte disposed between the positive electrode and the negative electrode is required in order to make the metal ions easily move between the positive electrode and the negative electrode and to maintain an electrically insulated state. In addition, the secondary battery includes various kinds of materials and designs. Meanwhile, a secondary battery requiring high induced current efficiency uses a solid electrolyte separator. Therefore, it is necessary to manufacture a solid electrolyte in consideration of economy and universal applicability; however, the results of research thereon are not satisfactory.

PRIOR ART DOCUMENT

Patent Document

Patent Document 1: Korean Registered Patent No. 10-0294467

SUMMARY OF THE INVENTION

Therefore, the present invention has been made in view of the above problems, and it is an object of the present invention to provide a method of manufacturing a solid electrolyte using water as a solvent.

Objects of the present invention devised to solve the problems are not limited to the aforementioned object, and other unmentioned objects will be clearly understood based on the following detailed description of the present invention.

In accordance with the present invention, the above and other objects can be accomplished by the provision of a method of manufacturing a solid electrolyte using water as a solvent, the method including dissolving a precursor in water to form a slurry, drying the slurry to form granules, pressing the granules to form a pressed solid body, and sintering the pressed solid body to manufacture a solid electrolyte.

The water may include deionized water, from which positive ions and negative ions have been chemically or physically removed.

The slurry may further include an additive, and the additive may include at least one of a binder or a dispersant.

Each of the granules may include the precursor deposited from the slurry.

The precursor may include $Na_3PO_4$, which is a water-soluble material.

The slurry may further include $ZrO_2$ and $SiO_2$, and the solid electrolyte may include $Na_3Zr_2Si_2PO_{12}$.

Details for accomplishing the above objects will be more clearly understood from the following detailed description of embodiments taken in conjunction with the accompanying drawings.

However, the present invention is not limited to the following embodiments but may be implemented in various different forms. The embodiments are provided merely to complete the disclosure of the present invention and to fully inform a person having ordinary skill in the art to which the present invention pertains (hereinafter, referred to as "those skilled in the art") of the category of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

DETAILED DESCRIPTION OF THE INVENTION

The present invention may be variously changed and may have various embodiments. Therefore, specific embodiments will be described in detail with reference to the accompanying drawings.

Various features of the invention disclosed in the claims will be more easily understood with reference to the accompanying drawings and the detailed description thereof. An apparatus, a method, a manufacturing process, and various embodiments disposed in this specification are provided for illustration. The disclosed structure and functional features are provided so that those skilled in the art may implement various embodiments in detail, rather than to limit the scope of the invention. Disclosed terms and sentences are provided to describe various features of the invention that are disclosed so as to be easily understood but not to limit the scope of the invention.

In the following description of the present invention, a detailed description of relevant known technology will be omitted when the same may obscure the subject matter of the present invention.

Hereinafter, a method of manufacturing a solid electrolyte according to an embodiment of the present invention will be described. For example, the solid electrolyte may include a sodium superionic conductor (NASICON).

Figure 1:
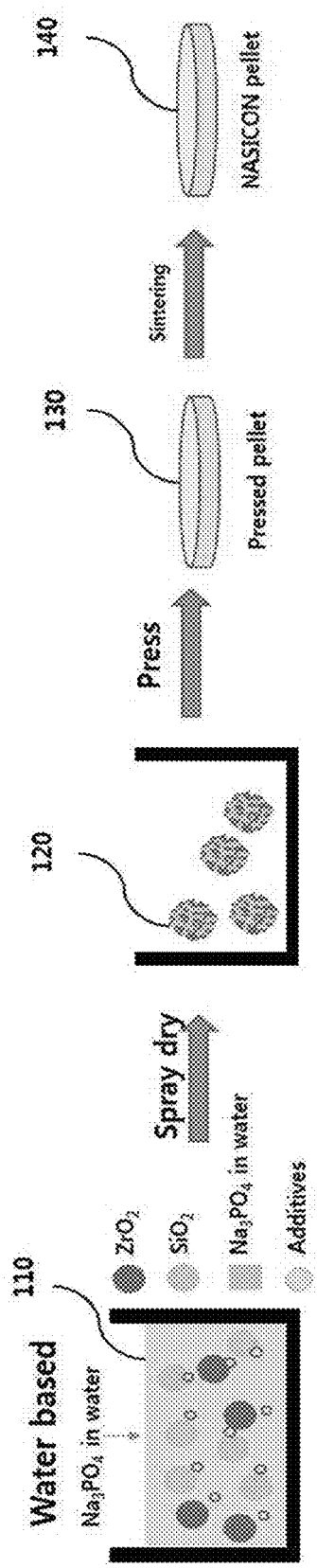
FIG. 1 is a conceptual view showing a method of manufacturing a solid electrolyte according to an embodiment of the present invention.

FIG. 1 is a conceptual view showing a method of manufacturing a solid electrolyte according to an embodiment of the present invention.

Referring to FIG. 1, a method of manufacturing a solid electrolyte using water as a solvent according to an embodiment of the present invention may include a dissolution step, a drying step, a pressing step, and a sintering step.

At the dissolution step, $ZrO_2$, $SiO_2$, $Na_3PO_4$, and additives, which are used as precursors, may be mixed with water to form a slurry 110. In this case, $Na_3PO_4$, which is a water-soluble material, is dissolved in the water. The water used as the solvent may be pure water, from which positive ions and negative ions in the water have been chemically or physically removed, i.e. deionized water.

At the drying step, the slurry 110 may be dried to form granules 120 of the mixture from the slurry. For example, the slurry 110 may be spray-dried to form granules 120 of the slurry.

At the pressing step, the granules 120 may be pressed using a pressing machine to form a pressed solid body 130. For example, the granules 120 may be pressed, for example, through a uniaxial press or cold isostatic press (CIP) to form a pallet-shaped pressed solid body 130.

At the sintering step, the pressed solid body 130 may be sintered to manufacture a solid electrolyte 140. Specifically, the pressed solid body 130 may be heated at a temperature of 1250° C., may melt, and may be hardened in the state in which components constituting the pressed solid body 130 are in tight contact with each other to manufacture a solid electrolyte 140. For example, the solid electrolyte 140 may include $Na_3Zr_2Si_2PO_{12}$.

Figure 2A:
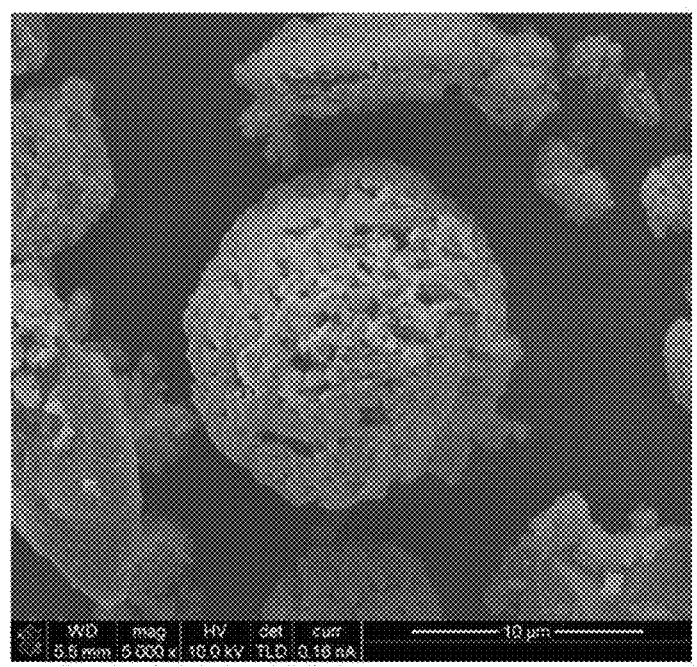
FIGS. 2A and 2B are views showing granules of the solid electrolyte according to the embodiment of the present invention.
Figure 2B:
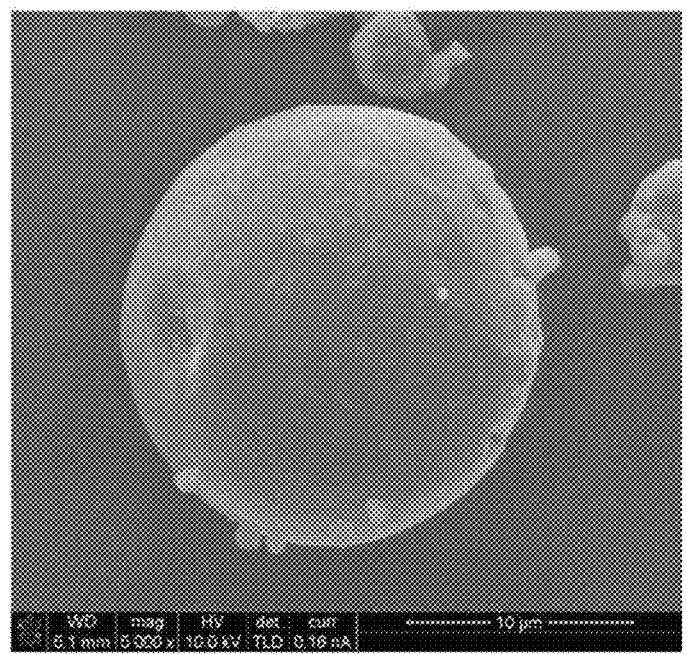

FIGS. 2A and 2B are views showing granules of the solid electrolyte according to the embodiment of the present invention.

A conventional method of manufacturing a solid electrolyte using ethanol as a solvent (i.e. an ethanol synthesis method) may include a mixing step, a drying step, a pressing step, and a sintering step. That is, in the conventional method of manufacturing the solid electrolyte using ethanol as the solvent, the mixing step is carried out in place of the dissolution step in the method of manufacturing the solid electrolyte according to the embodiment of the present invention. At the mixing step, a mixture including $ZrO_2$, $SiO_2$, $Na_3PO_4$, and additives is not completely dissolved in the ethanol but is mixed in the ethanol in the form of solid powder. Referring to FIG. 2A, therefore, it can be seen that each granule of the mixture formed by drying the solid powder at the drying step has a coarse surface, has a plurality of empty spaces, and has therein the mixture in the state of not being uniformly mixed.

In contrast, the method of manufacturing the solid electrolyte using water as the solvent according to the embodiment of the present invention (i.e. an aqueous synthesis method) is characterized in that, in the case in which water is used as the solvent at the dissolution step, $Na_3PO_4$ is dissolved in the water, since $Na_3PO_4$ is a water-soluble material. Referring to FIG. 2B, therefore, it can be seen that, in the case in which slurry including water having $Na_3PO_4$ dissolved therein is dried at the drying step, $ZrO_2$, $SiO_2$, and additives may effectively cling to each other as $Na_3PO_4$ is deposited, whereby granules having high density and having $Na_3PO_4$ uniformly mixed therein are formed.

FIGS. 3A to 3D are graphs showing materials constituting the granules according to the embodiment of the present invention.

Figure 3A:
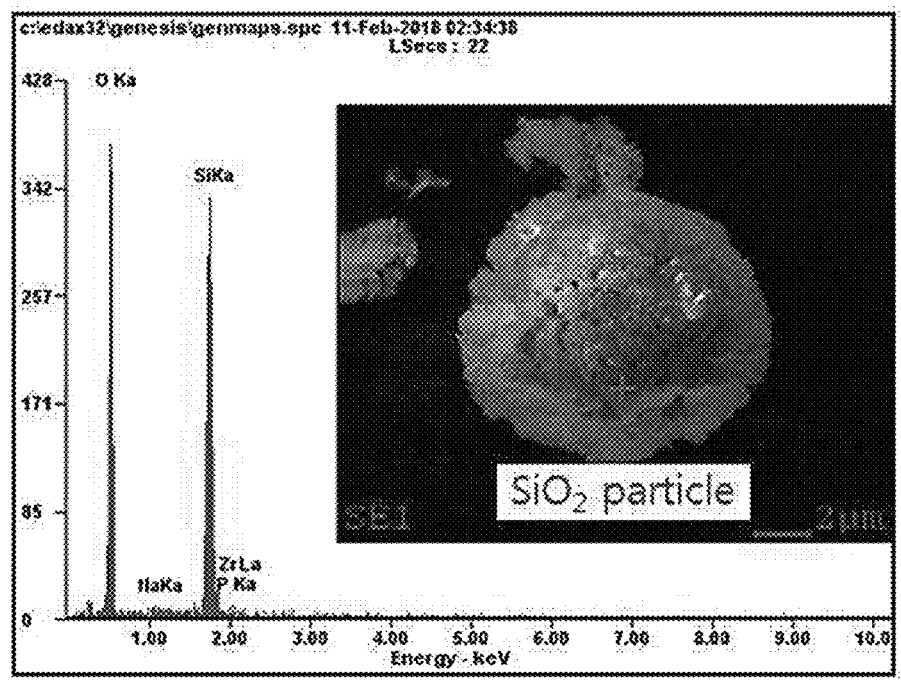
FIGS. 3A to 3D are graphs showing materials constituting the granules according to the embodiment of the present invention.
Figure 3B:
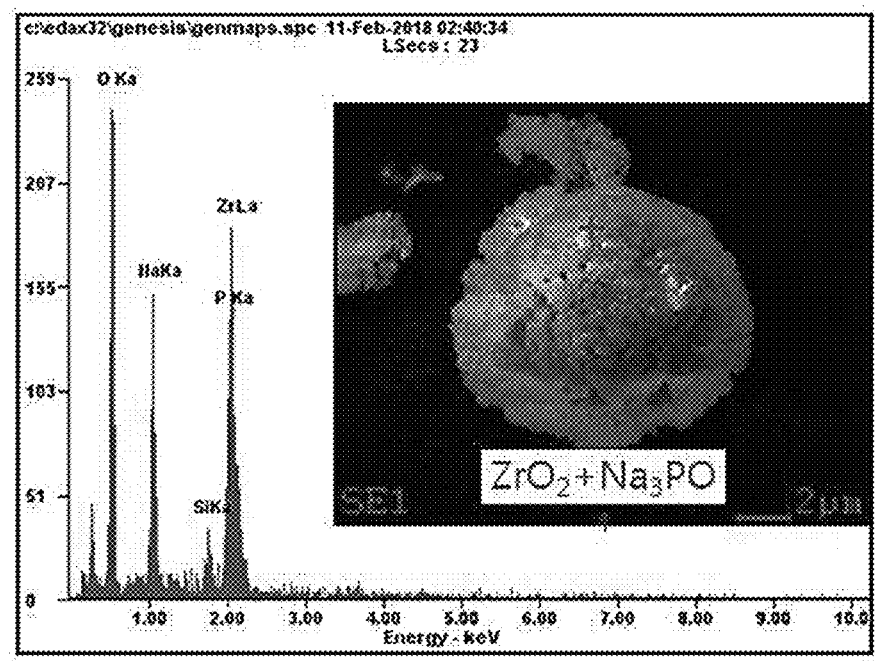

Referring to FIGS. 3A and 3B, it can be seen that, among the materials constituting the granules formed according to the conventional method of manufacturing the solid electrolyte using ethanol as the solvent at the first position thereof, O and Si each have a peak and that, among the materials constituting the granules at the second position thereof, O, Na, P, and Zr each have a peak. That is, at the second position of each granule, $ZrO_2$ and $Na_3PO_4$ are observed to be mixed with each other, but at the first position of each granule, $SiO_2$ alone is observed, i.e. only a single material is observed. Therefore, it can be seen that each granule formed according to the conventional method of manufacturing the solid electrolyte using ethanol as the solvent has therein a portion in which the precursors are not uniformly mixed with each other depending on the position thereof.

Figure 3C:
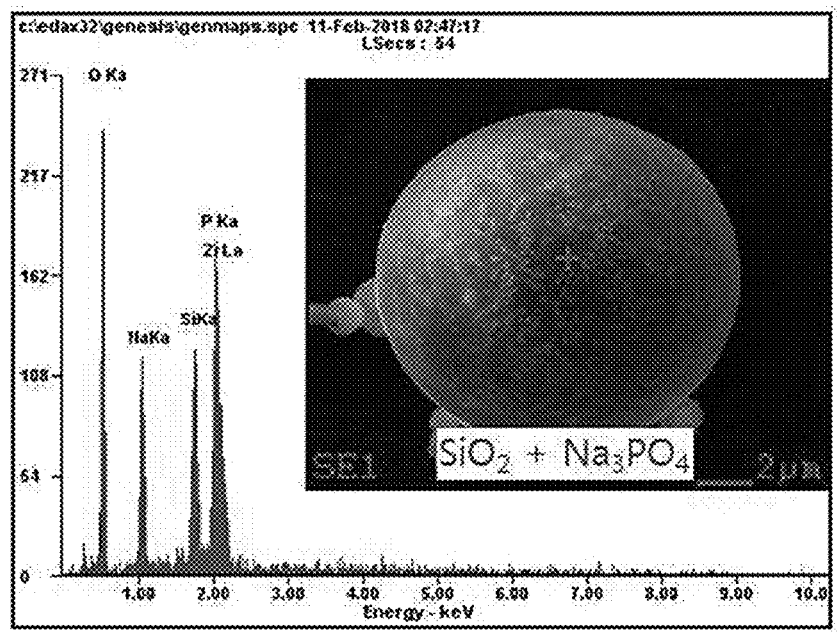
Figure 3D:
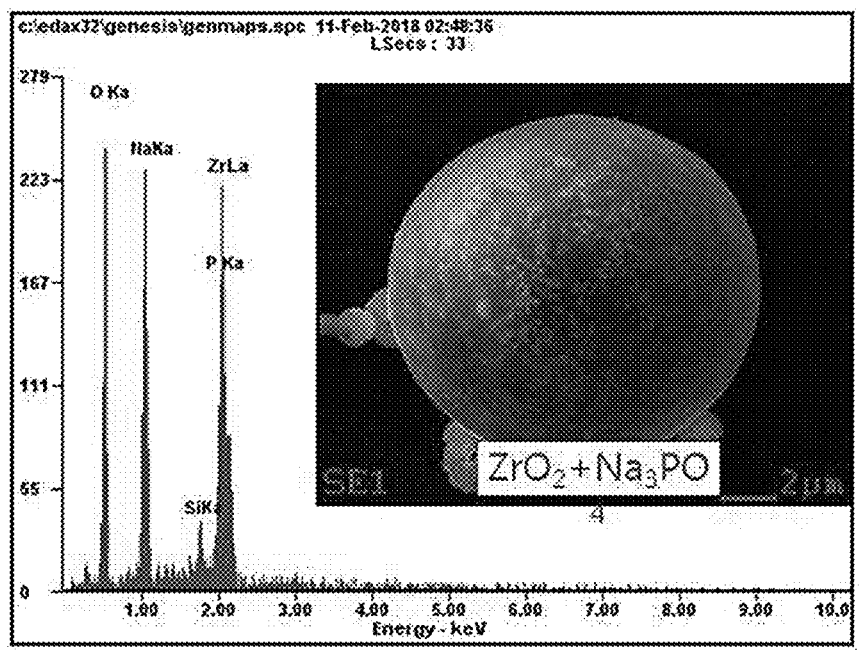

Referring to FIGS. 3C and 3D, it can be seen that, among the materials constituting each granule formed according to the method of manufacturing the solid electrolyte according to the embodiment of the present invention at the first position thereof, O, Na, P, and Si each have a peak and that, among the materials constituting each granule at the second position thereof, O, Na, P, and Zr each have a peak. That is, at the first position of each granule, $SiO_2$ and $Na_3PO_4$ are observed to be mixed with each other, and at the second position of each granule, $ZrO_2$ and $Na_3PO_4$ are observed to be mixed with each other. In other words, two kinds of precursors are observed at various positions of each granule. Therefore, it can be seen that, in the granules formed at the drying step of the method of manufacturing the solid electrolyte according to the embodiment of the present invention, the precursors are uniformly mixed with each other at various positions.

Figure 4:
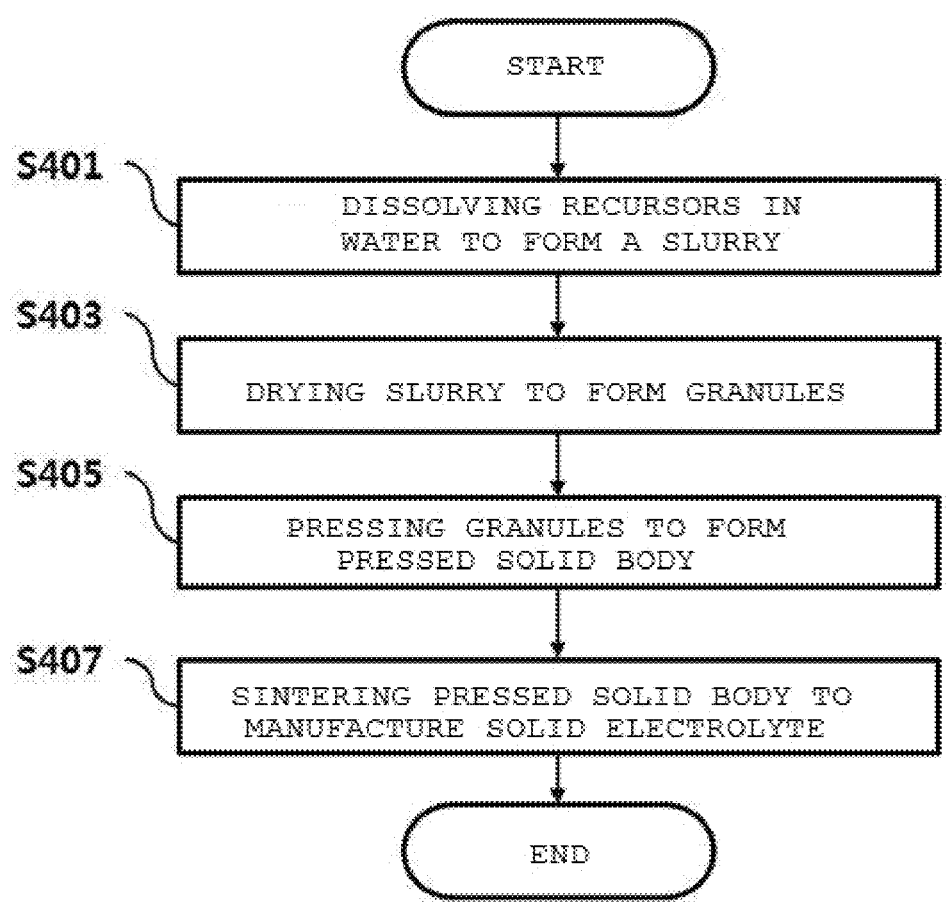
FIG. 4 is a flowchart showing the method of manufacturing the solid electrolyte according to the embodiment of the present invention.

FIG. 4 is a flowchart showing the method of manufacturing the solid electrolyte according to the embodiment of the present invention.

Referring to FIG. 4, step S410 is a step of dissolving precursors in water to form a slurry. In one embodiment, precursors that have not been dissolved in the water may be additionally included in the slurry. For example, the slurry may include $Na_3PO_4$ as a precursor that has been dissolved in the water and may include $ZrO_2$, $SiO_2$, and additives as precursors that have not been dissolved in the water. According to the embodiment of the present invention, it is possible to economically form the slurry, since water, which is used to form the slurry, is less expensive than ethanol. In addition, according to the embodiment of the present invention, various kinds of additives (for example, a binder and a dispersant) may be used, since water is used to form the slurry. In contrast, in the case in which an organic material, such as ethanol, is used in order to form the slurry according to the conventional method of manufacturing the solid electrolyte using ethanol as the solvent, the kinds of additives that can be used are limited.

Step S420 is a step of drying the slurry to form granules. In the case in which the slurry is dried to form granules according to the embodiment of the present invention, water is evaporated. At this time, however, the water does not generate a bad smell. In contrast, in the case in which the slurry is dried to form granules according to the conventional method of manufacturing the solid electrolyte using ethanol as the solvent, the ethanol generates a bad smell while evaporating. Consequently, approval from relevant organizations and the installation of appropriate treatment facilities are required in order to treat ethanol vapor.

Step S430 is a step of pressing the granules to form a pressed solid body. In one embodiment, the granules of the mixture may be pressed using a pressing machine in order to form a pressed solid body.

Step 440 is a step of sintering the pressed solid body to manufacture a solid electrolyte. According to the embodiment of the present invention, granules having high density and having $Na_3PO_4$ uniformly mixed therein are formed. In the case in which the pressed solid body, formed from the granules, is sintered, a desired phase is obtained, whereby a solid electrolyte having high density, ion conductivity, and rigidity is manufactured. In contrast, each granule formed according to the conventional method of manufacturing the solid electrolyte using ethanol as the solvent has a coarse surface, has a plurality of empty spaces, and has therein the mixture in the state of not being uniformly mixed. In the case in which a pressed solid body formed from the granules formed according to the conventional method of manufacturing the solid electrolyte is sintered, therefore, a desired phase is not obtained and a secondary phase is formed, whereby a solid electrolyte having low density is manufactured.

As is apparent from the above description, according to an embodiment of the present invention, a solid electrolyte is manufactured using water as a solvent, whereby it is possible to reduce manufacturing costs compared to the case in which ethanol is used as the solvent. The installation of appropriate treatment facilities approved by a relevant organization is required in order to discharge ethanol vapor generated when ethanol is used as the solvent. In contrast, in the case in which water is used as the solvent, no post treatment is required, and safety is guaranteed since no ethanol vapor is discharged. In addition, in the case in which water is used as the solvent, a wide selection of additives becomes available.

It should be noted that effects of the present invention are not limited to the effects mentioned above, and potential effects expected from the technical characteristics of the present invention will be clearly understood from the above description of the present invention.

The above description has been made merely to illustrate the technical idea of the present invention, and those skilled in the art will appreciate that various variations and modifications are possible without departing from the intrinsic features of the present invention.

Therefore, the embodiments disclosed in this specification are provided to describe the technical idea of the present invention, rather than to limit the technical idea of the present invention, and the scope of the present invention is not limited by the embodiments.

The scope of protection of the present invention should be determined by the appended claims, and all technical ideas within the range equivalent to the appended claims should be understood to fall within the scope of rights of the present invention.

What is claimed is:

1. A method of manufacturing a solid electrolyte, the method comprising:
    dissolving a first precursor comprising $Na_3PO_4$ in water;
    mixing a second precursor comprising $ZrO_2$ and $SiO_2$ with the water in which the first precursor is dissolved, to form a slurry,
    wherein the water comprises deionized water, from which positive ions and negative ions have been chemically or physically removed, and
    wherein the first precursor is soluble in the deionized water and the second precursor is insoluble in the deionized water;
    adding a binder and a dispersant to the slurry;
    drying the slurry including the first precursor comprising $Na_3PO_4$ and the second precursor comprising $ZrO_2$ and $SiO_2$, to form granules in which the first precursor and the second precursor are uniformly mixed with each other in a plurality of positions,
    wherein at first positions of the granules, $SiO_2$ and $Na_3PO_4$ are mixed with each other and at second positions of the granules, $ZrO_2$ and $Na_3PO_4$ are mixed with each other;
    pressing the granules to form a pallet-shaped pressed solid body; and
    sintering the pressed solid body to manufacture a solid electrolyte comprising $Na_3Zr_2Si_2PO_{12}$ having high density, ion conductivity, and rigidity.

2. The method according to claim 1, wherein the pressing the granules comprises performing a uniaxial press to the granules, to form the pallet-shaped pressed solid body.

3. The method according to claim 1, wherein the pressing the granules comprises performing a cold isostatic press (CIP) to the granules, to form the pallet-shaped pressed solid body.

* * * * *